(12) United States Patent
Nguyen

(10) Patent No.: US 7,580,434 B2
(45) Date of Patent: Aug. 25, 2009

(54) DUAL LASER DRIVER ARCHITECTURE IN AN OPTICAL TRANSCEIVER

(75) Inventor: The'Linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/863,098

(22) Filed: Sep. 27, 2007

(65) Prior Publication Data

US 2008/0080577 A1   Apr. 3, 2008

Related U.S. Application Data

(60) Provisional application No. 60/827,239, filed on Sep. 28, 2006.

(51) Int. Cl.
*H01S 3/00* (2006.01)

(52) U.S. Cl. .................. 372/38.02; 327/38.07

(58) Field of Classification Search ............ 372/38.02, 372/29.015, 38.1, 38.07
See application file for complete search history.

(56) References Cited

U.S. PATENT DOCUMENTS

| 5,896,408 A * | 4/1999 | Corzine et al. ......... 372/46.013 |
| 6,920,163 B2 * | 7/2005 | Ishii ...................... 372/38.02 |

* cited by examiner

*Primary Examiner*—Armando Rodriguez
(74) *Attorney, Agent, or Firm*—Workman Nydegger

(57) ABSTRACT

Embodiments disclosed herein relate to a dual laser driver architecture configured to be implemented on a single IC chip. The dual laser driver architecture includes at least a first laser driver stage configured to drive a first laser with a first current and a second laser driver stage configured to drive a second laser with a second current that is less than the first current. Embodiments also relate to an optical transceiver that implements the dual laser driver architecture.

19 Claims, 7 Drawing Sheets

DUAL LASER DRIVER ARCHITECTURE IN AN OPTICAL TRANSCEIVER

CROSS-REFERENCE TO RELATED APPLICATIONS

This application claims the benefit of U.S. Provisional Application No. 60/827,239, filed Sep. 28, 2006, which is incorporated herein by reference in its entirety.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to as the "controller") controls the operation of the laser driver and post-amplifier.

Accordingly, as data transmission rates increase it would be advantageous to have laser drivers with increased functionality and with the ability to drive more than one type of laser.

BRIEF SUMMARY

Embodiments disclosed herein relate to a dual laser driver architecture configured to be implemented on a single IC chip. The dual laser driver architecture includes at least a first laser driver stage configured to drive a first laser with a first current and a second laser driver stage configured to drive a second laser with a second current that is less than the first current.

Embodiments disclosed herein also relate to an optical transceiver. The optical transceiver includes a post-amplifier, an optical receiver coupled to the post-amplifier, a laser driver, and a control module coupled to the laser driver and the post-amplifier. The laser driver includes at least a first laser driver stage configured to drive a first laser with a first current and a second laser driver stage configured to drive a second laser with a second current that is less than the first current. A first electro-optical transducer is coupled to the first driver stage and a second electro-optical transducer is coupled to the second driver stage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to a dual laser driver architecture configured to be implemented on a single IC chip. The dual laser driver architecture includes at least a first laser driver stage configured to drive a first laser with a first current and a second laser driver stage configured to drive a second laser with a second current that is less than the first current.

Embodiments disclosed herein also relate to an optical transceiver. The optical transceiver includes a post-amplifier, an optical receiver coupled to the post-amplifier, a laser driver, and a control module coupled to the laser driver and the post-amplifier. The laser driver includes at least a first laser driver stage configured to drive a first laser with a first current and a second laser driver stage configured to drive a second laser with a second current that is less than the first current. A first electro-optical transducer is coupled to the first driver stage and a second electro-optical transducer is coupled to the second driver stage.

I. Operating Environment

Figure 1:
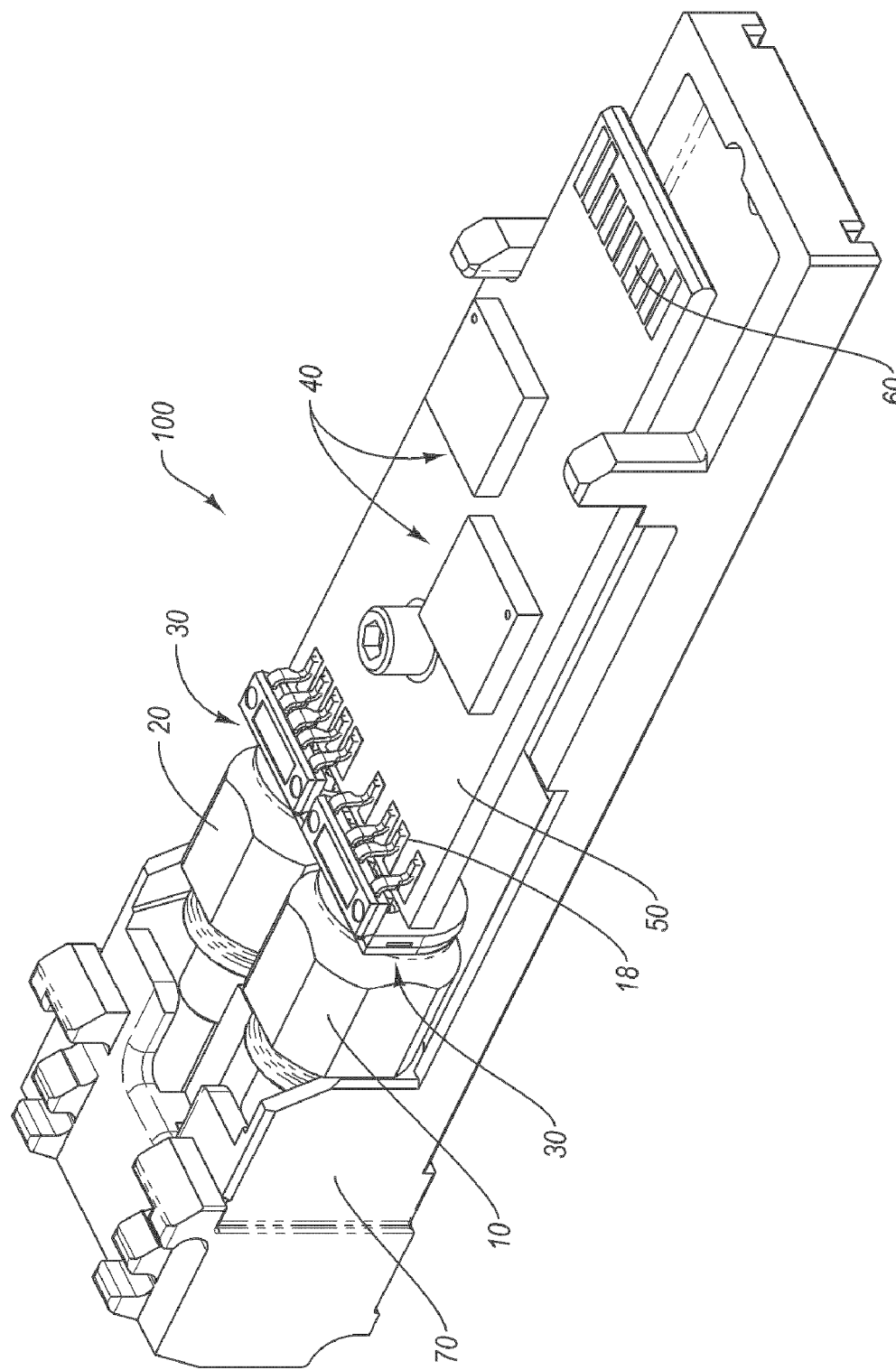
FIG. 1 is a perspective view of an example of an optical transceiver module.

Reference is first made to FIG. 1, which depicts a perspective view of an example optical transceiver module ("transceiver"), generally designated at 100, for use in transmitting and receiving optical signals in connection with an external host that is operatively connected, in one embodiment, to a communications network. As shown, the transceiver shown in FIG. 1 includes various components, including a Receiver Optical Subassembly ("ROSA") 10, a Transmitter Optical Subassembly ("TOSA") 20, electrical interfaces 30, various electronic components 40, such as a laser-driver/a post-amplifier and control module for example, and a printed circuit board 50 which supports the electronic components 40.

In the illustrated embodiment, two electrical interfaces 30 are included in the transceiver 100, one each used to electrically connect the ROSA 10 and the TOSA 20 to a plurality of conductive pads located on the PCB 50. The electronic components 40 are also attached to the PCB 50. An edge connector 60 is located on an end of the PCB 50 to enable the transceiver 100 to electrically and mechanically interface with a host (not shown). In addition, the above-mentioned components of the transceiver 100 are partially housed within a housing 70. Though not shown, some embodiments include a shell that cooperates with the housing 70 to define an enclosure for components of the transceiver 100.

Figure 2:
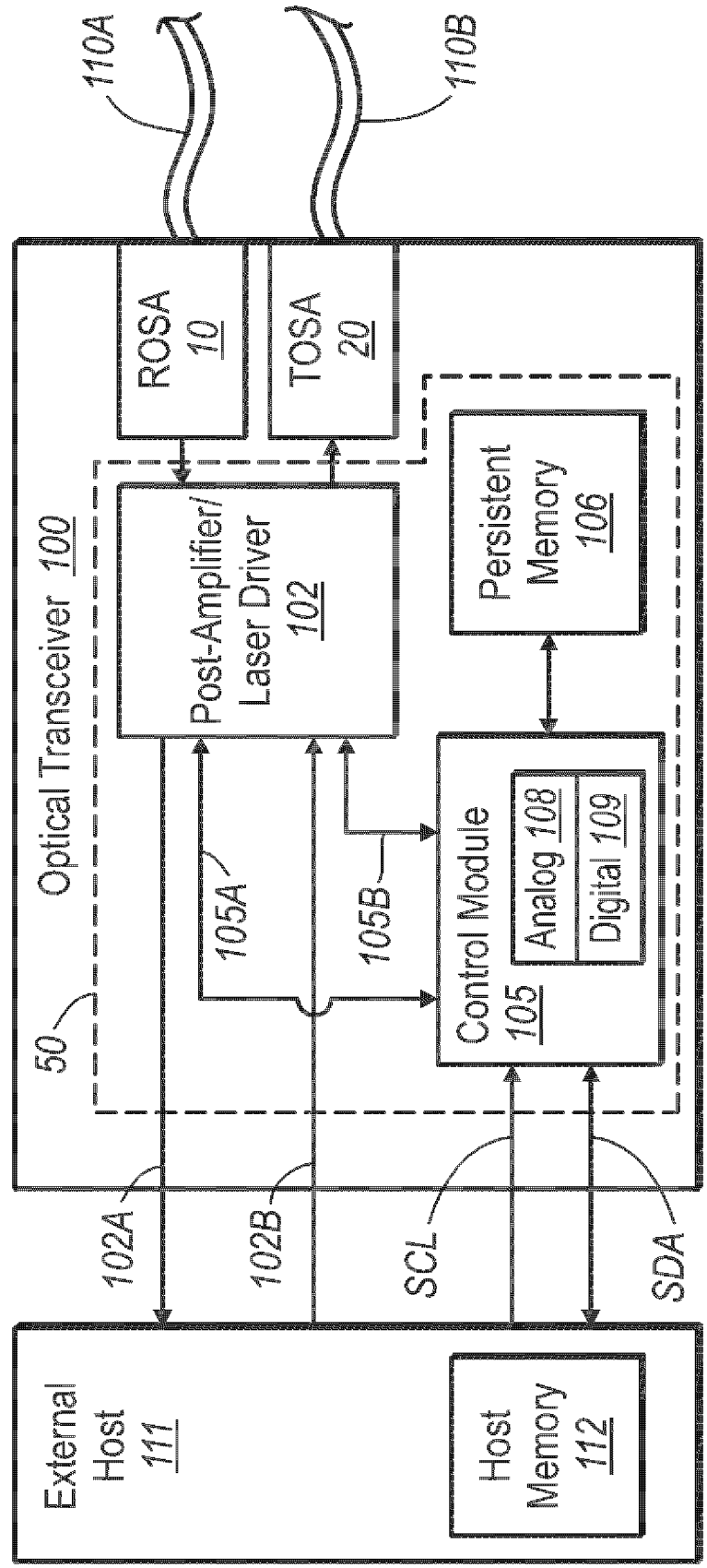
FIG. 2 is a simplified block view showing various aspects of the optical transceiver module of FIG. 1.

Reference is now made to FIG. 2, which is a simplified block diagram of an example of an optical transceiver, denoted at 100 in FIG. 1, depicting various physical and operational aspects of the transceiver. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including 1 Gbit/s, 2 Gbit/s, 4 Gbit/s, 10 Gbit/s, as well as even higher data rates. Furthermore, the embodiments described herein can be implemented in optical transceivers conforming with any of a variety of different form factors, examples of which include, but are not limited to, XFP, SFP and SFF, as well as a variety of different communication protocols, examples of which include, but are not limited to, GiGE, SONET, and Fibre Channel.

With continuing reference to FIG. 2, and with reference as well to FIG. 1, transceiver 100 includes printed circuit board ("PCB") 50 on which the various electronic components of the transceiver are mounted. One such component is a control module 105. Control module 105 is connected to an integrated post-amplifier/laser driver ("PA/LD") 102 by connections 105A and 105B. These connections allow control module 105 to monitor the operation of the post-amplifier/laser driver 102 as will be described in more detail to follow. Control module 105 is connected to a persistent memory 106, which stores microcode for configuring control module 105 and is also used to store operational parameters. The control module 105 is also able to communicate with an external host 111 as depicted by the Serial Data line (SDA) and Serial Clock line (SCL).

Transceiver 100 includes both a transmit path and a receive path, both of which will now be described. The receive path includes ROSA 10, which transforms an incoming optical data signal into an electrical data signal. The electrical data signal is then provided to a post-amplifier portion of PA/LD 102. The post-amplifier amplifies and otherwise processes the electrical data signal and provides the electrical data signal to the external host 111 via connection 102A.

For the transmit path, external host 111 generates an electrical data signal and provides the electrical data signal to a laser driver portion of PA/LD 102 via connection 102B. The laser driver processes the electrical data signal and drives the TOSA 20, which causes the TOSA 20 to emit an optical data signal.

The operation of transceiver 100 will now be described in further detail. In operation, the optical transceiver 100, receives an optical data signal from a fiber 110A via the ROSA 10 in manner to be described more fully below. The ROSA 10 transforms the received optical data signal into an electrical data signal. The ROSA 10 then provides the resulting electrical data signal to a post-amplifier. In the illustrated embodiment, the post amplifier is consolidated with the laser driver as an integrated PA/LD 102. As such, the PA/LD 102 resides on a single integrated circuit chip and is included as a component, together with the other electronic components 40, some of which are further described below, on PCB 50. In other embodiments, the post amplifier and laser driver are implemented as separate components on the PCB 50.

The post-amplifier portion of the PA/LD 102 amplifies the received electrical data signal and provides the amplified data signal to external host 111 over signal path 102A. The external host 111 may be any computing system capable of communicating with the optical transceiver 100. The external host 111 contains a host memory 112 that may be any volatile or non-volatile memory source. In one embodiment, some components of the optical transceiver 100 can reside on the host 111 while the other components of the transceiver reside on the PCB 50 separate from the host 111.

The optical transceiver 100 may also receive electrical data signals from the host 111 for transmission onto a fiber 110B. Specifically, the laser driver portion of the PA/LD 102 receives the electrical data signal from the host 111 via the signal path 102B, and drives a light source within the TOSA 20. One example of a light source is a DML that causes the TOSA 20 to emit onto the fiber 110B optical data signals representative of the information in the electrical data signal provided by the host 111.

The behavior of the ROSA 10, the PA/LD 102, and the TOSA 20 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, age of the laser, and/or operating conditions, such as voltage, and receive information from the post-amplifier portion of the PA/LD 102 by way of connection 105A, and from the laser driver portion of the PA/LD by way of connection 105B. This arrangement allows the control module 105 to optimize the performance of the laser to compensate for dynamically varying conditions.

Specifically, the control module 105 optimizes the operation of the transceiver 100 by adjusting settings on the PA/LD 102 as represented by the connections 105A and 105B. These settings adjustments can be intermittent and are generally only made when temperature or voltage or other low frequency changes so warrant.

The control module 105 has access to a persistent memory 106, which in one embodiment, is an Electrically Erasable and Programmable Read Only Memory (EEPROM). Persistent memory 106 may also be any other non-volatile memory source. Persistent memory 106 is used to store microcode for configuring control module 105 and for storing operational parameters that have been measured by the control module 105. The persistent memory 106 and the control module 105 may be packaged together in the same package or in different packages without restriction.

Data and clock signals may be provided from the host 111 to the control module 105 using the SDA and SCL lines respectively. Also data may be provided from the control module 105 to the host 111 to allow for transmitting diagnostic data such as environmental and/or operational parameters. The control module 105 includes both an analog portion 108 and a digital portion 109. In this example, the analog portion 108 and the digital portion 109 collectively enable the control module to implement logic digitally, while still largely interfacing with the rest of the optical transceiver 100 using analog signals.

II. Example Laser Driver Architecture

Figure 3:
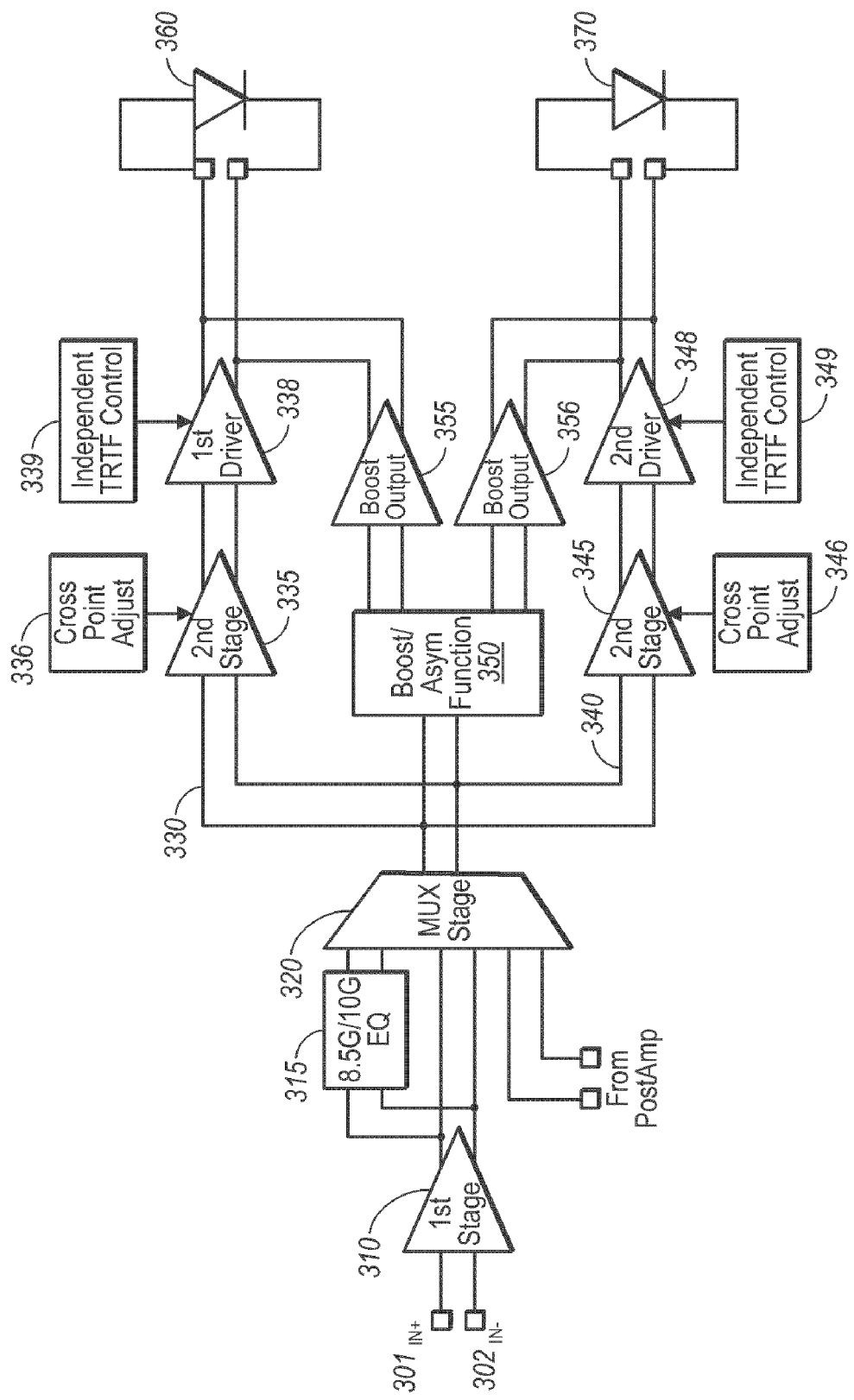
FIG. 3 is a block diagram showing a dual laser driver architecture in accordance with the embodiments disclosed herein.

FIG. 3 illustrates an example laser driver architecture 300 in accordance with the principles of the present invention. Architecture 300 may correspond to a portion of the laser driver previously described in relation to FIG. 2, although this is not required. Note that although various components are illustrated as comprising architecture 300, it should be understood that this is for illustration only. The embodiments disclosed herein contemplate an architecture 300 with additional components not illustrated in FIG. 3. Also note that the reference to a first, second, third, etc. component in this description and in the claims is not intended to imply any sequential listing and is merely intended to distinguish one component from another unless specifically noted. In addition, in the claims and in the specification, two or more elements are "coupled" or "connected" if they are either directly coupled or connected or indirectly coupled or connected through one or more intervening elements.

In some embodiments, laser driver architecture 300 may be implemented on a single IC chip. In still further embodiments, a post-amplifier may also be implemented on the same chip as laser driver architecture 300. Advantageously, this single chip solution allows for reduced space when implemented in an optical transceiver. Further, costs may be reduced as the various drivers of laser driver architecture 300 may share one or more stages.

In particular, laser driver architecture 300 includes a first driver stage and a second driver stage. As will be explained in more detail to follow, use of the two driver stages allows laser driver architecture 300 to drive more than one type of laser or LED. Note that it will be obvious to one of skill in the art that additional driver stages may be added to laser driver architecture 300 as circumstances warrant.

As shown, laser driver architecture 300 is connected to a control signal 305 that comes from a control module such as control module 105 of FIG. 2. The control signal 305 is used to pre-select which of the two driver paths will be used for a particular application. At a later date, control signal 305 may be implemented to change the selected driver path.

Laser driver architecture 300 includes a differential input 301 and 302. The differential input may receive a differential signal from host 111 or from some other portion of optical transceiver 100. Specifically, input node 301 receives the positive signal portion and input node 302 receives a complimentary signal portion. The differential signal received at nodes 301 and 302 may be 1 Gbit/s, 2 Gbit/s, 4 Gbit/s, 10 Gbit/s, as well as even higher data rates. Note that although FIG. 3 and its accompanying description depict the received signal as being differential, the embodiments disclosed herein also apply to a singled ended system.

The received differential signals are propagated to a first stage 310 for amplification and various signal processing. For example, in some embodiments first stage 310 may be used to reverse the polarity of the received signals as circumstances warrant. In still other embodiments, first stage 310 may include a frequency compensation circuit configured to compensate for bandwidth-limiting, reflection and other types of signal distortion on the input signal.

The differential signal is then propagated from first stage 310 to multiplexer stage 320 for further amplification and signal processing. In some embodiments, a portion of the differential signals pass through a jitter equalization stage 315 for additional signal processing before being propagated to multiplexer stage 320. Further details jitter equalization stage 315 may be found in commonly owned, co-pending U.S. patent application Ser. No. 11/041,488, filed Jan. 24, 2005, which is incorporated by reference in its entirety.

As shown in FIG. 3, in some embodiments multiplexer stage 320 is coupled to a post-amplifier such as the post amplifier portion of post-amplifier/laser driver 102. In such embodiments, this connection allows for loop-back testing of the post-amplifier and laser driver architecture 300 as well as other signal sharing as circumstances warrant.

As illustrated, laser driver architecture 300 includes a high current driver path 330 and a low current driver path 340. Implementing a high current driver path and a low current driver path allows for several advantages. For example, some lasers require less current to drive than do other lasers. Accordingly, the lasers that require less current may be driven by low current path 340 while those requiring higher current may be driven by high current path 330. This allows for power savings. In one embodiment, high power path 330 is configured for signals of 80 mA and low power path 340 is configured to signals of 14 mA. Furthermore, this architecture should also allow for better EMI performance since the laser driver is appropriately optimized for the laser that it is intended to drive.

Figure 4:
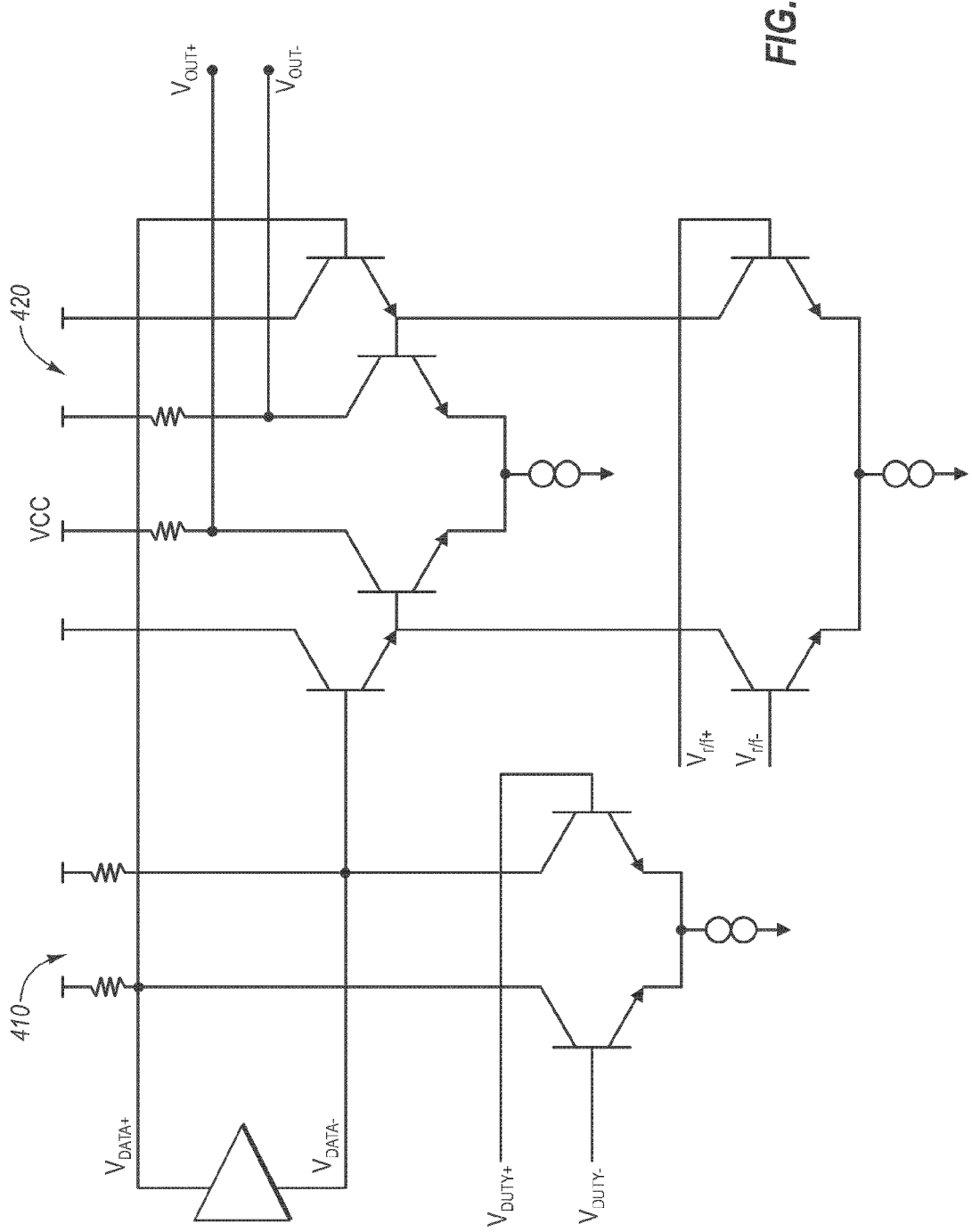
FIG. 4 illustrates a duty cycle control and asymmetric rise/fall time control circuit that may be implemented by an embodiment of a dual laser driver architecture in accordance with the embodiments disclosed herein.

As mentioned previously, a control signal 305 specifies which of high current path 330 or low current path 340 are to be used. For example, if high current path 330 is selected, then the differential signal is propagated from multiplexer stage 320 to a high current path second stage 335 for further amplification and other signal processing. In some embodiments, second stage 335 includes or is coupled to a cross-point adjustment circuit 336. The cross-point adjustment circuit 336 is configured to adjust the cross-point of the received signals up or down so that the duty cycle of the received signal is approximately 50%. An example cross-point adjustment circuit is illustrated in FIG. 4 at reference numeral 410. Further details on cross-point adjustment or duty-cycle control circuit 410 may be found in commonly owned, co-pending U.S. patent application Ser. No. 11/626,081, filed Jan. 23, 2007, which is incorporated by reference in its entirety.

Returning to FIG. 3, the differential signals are then propagated to first driver stage 338 for further amplification and signal processing. As can be seen, first driver stage 338 is the stage that actually drives a laser 360. In some embodiments, first driver stage 338 is configured to primarily to drive a laser 360 that is an edge emitting laser such as a DFB laser or a Fabry-Perot (FP) laser. First driver stage 338 may also be configured to drive a laser 360 that is a Vertical Cavity Surface Emitting Laser (VCSEL) as well. Of course, one of skill in the art will recognize that other types of lasers may be driven by first driver stage 338.

Figure 5:
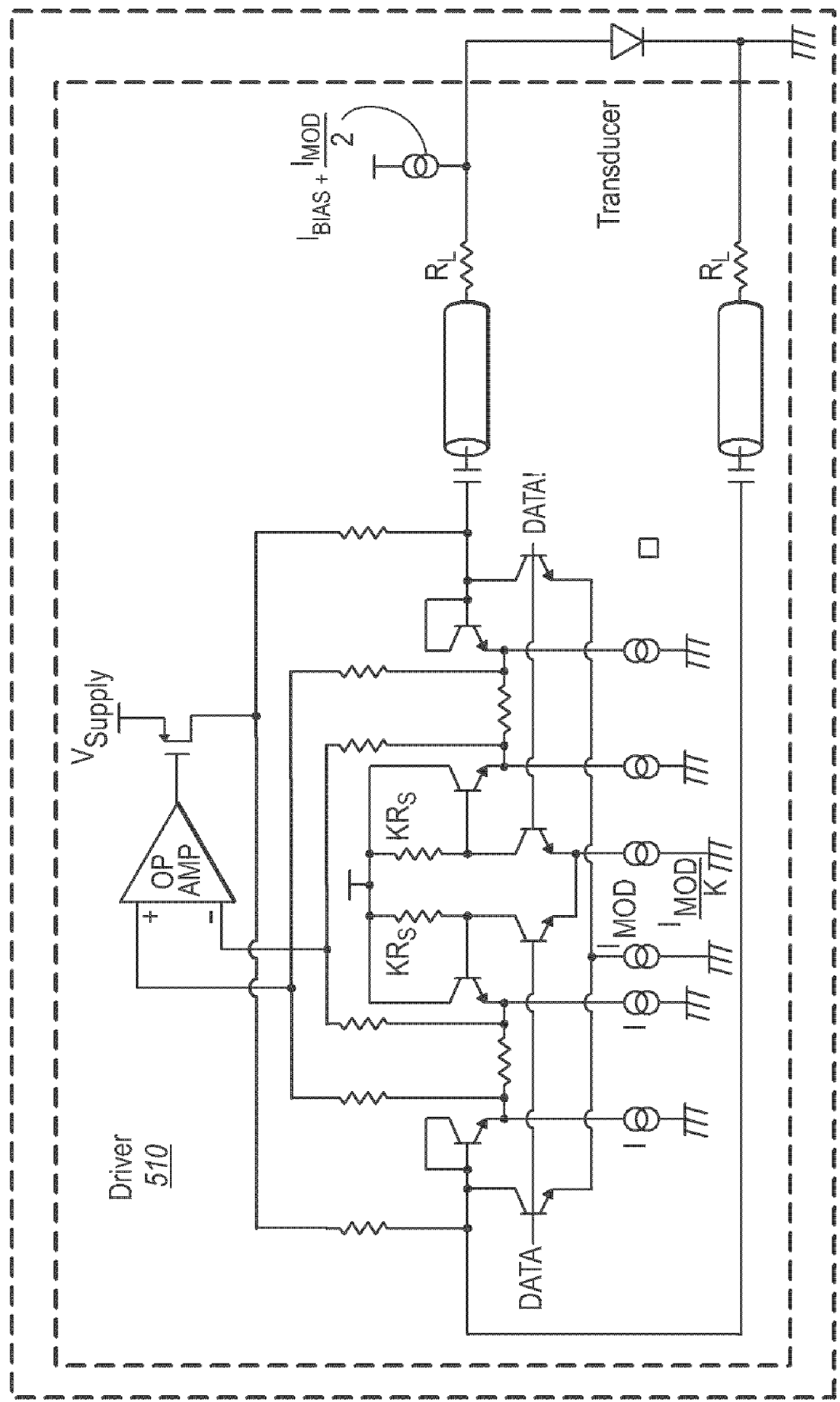
FIG. 5 illustrates an active match laser driver that may be implemented by an embodiment of a dual laser driver architecture in accordance with the embodiments disclosed herein.

In one embodiment, first driver stage 338 may be an active match driver stage. An example active match driver stage is illustrated at 510 in FIG. 5. Further details on active match driver 510 may be found in commonly owned, U.S. Pat. No. 6,965,722, filed Mar. 8, 2005, which is incorporated by reference in its entirety.

In some embodiments, first driver stage 338 may include or be coupled to an independent rise/fall time control circuit 339 that is configured to adjust the rise/fall time of the signals output by first driver stage 338. An example rise/fall time control circuit is illustrated in FIG. 4 at reference 420. Further details on independent rise/fall time control circuit 339 may be found in commonly owned, co-pending U.S. patent application Ser. No. 11/626,081 that was previously incorporated by reference.

On the other hand, if low current path 340 is selected, then the differential signal is propagated from multiplexer stage 320 to a low current path second stage 345 for further amplification and other signal processing. In some embodiments, second stage 345 includes or is coupled to a cross-point adjustment circuit 346 that is configured to adjust the cross-point of the received signals up or down so that the duty cycle of the received signal is approximately 50%. Cross-point adjustment circuit 346 may be the same as cross-point adjustment circuit 336 previously discussed and illustrated as 410 in FIG. 4.

Figure 6:
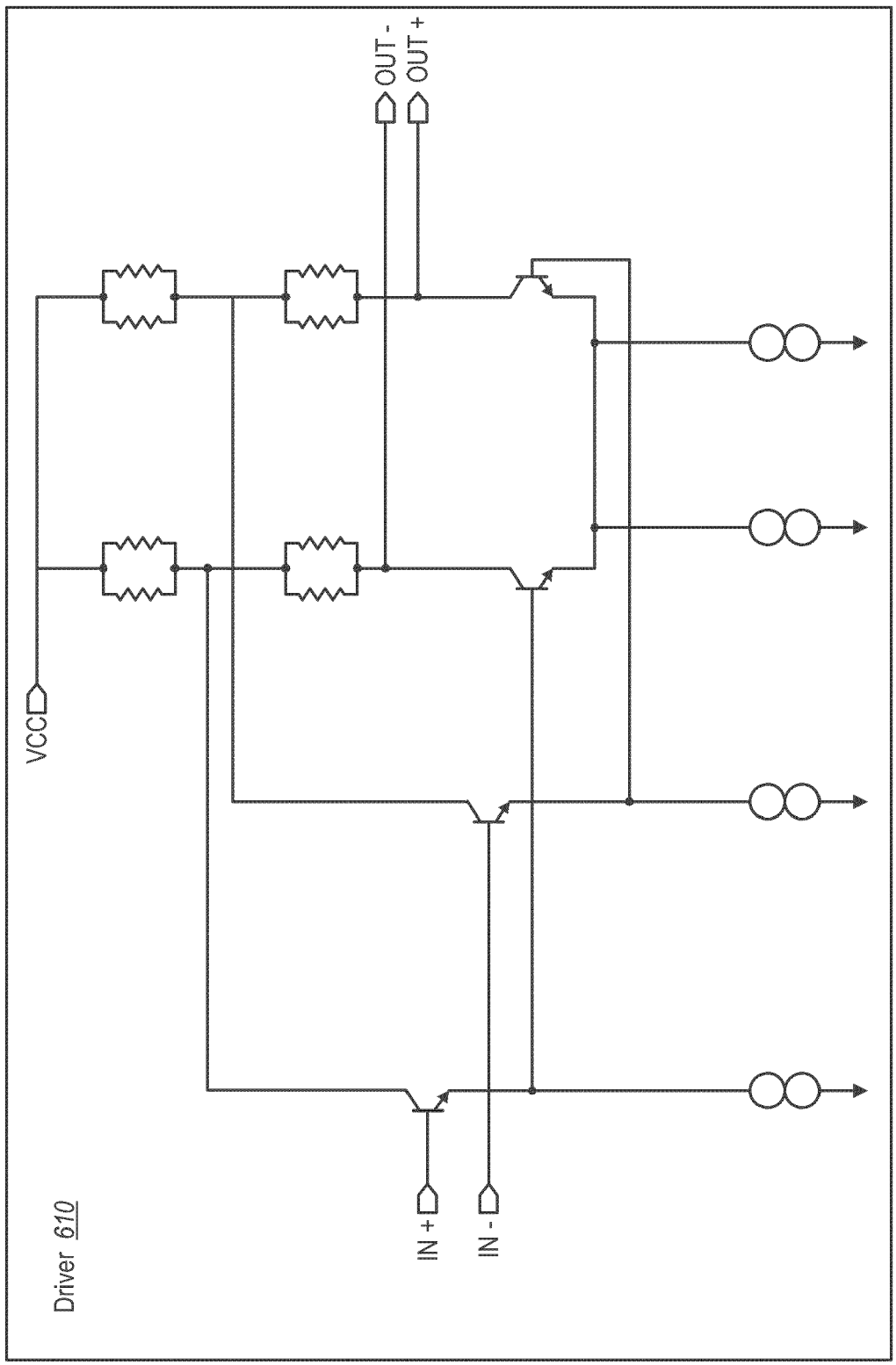
FIG. 6 illustrates a CML laser driver that may be implemented by an embodiment of a dual laser driver architecture in accordance with the embodiments disclosed herein.

Returning to FIG. 3, the differential signals are then propagated to second driver stage 348 for further amplification and signal processing. As can be seen, second driver stage 338 is the stage that actually drives a laser 370. In the present embodiment, second driver stage 338 is configured to drive a laser 360 that is a VCSEL. Of course, one of skill in the art will recognize that other types of lasers may be driven by second driver stage 348 as circumstances warrant. In one embodiment, second driver stage 348 may be Current Mode Logic (CML) driver stage. An example CML driver stage is illustrated at 610 in FIG. 6.

In some embodiments, second driver stage 348 may include or be coupled to an independent rise/fall time control circuit 349 that is configured to adjust the rise/fall time of the signals output by second driver stage 348. Independent rise/fall time control circuit 349 may be the same as independent rise/fall time control circuit 339 previously discussed and illustrated as 420 in FIG. 4.

Figure 7:
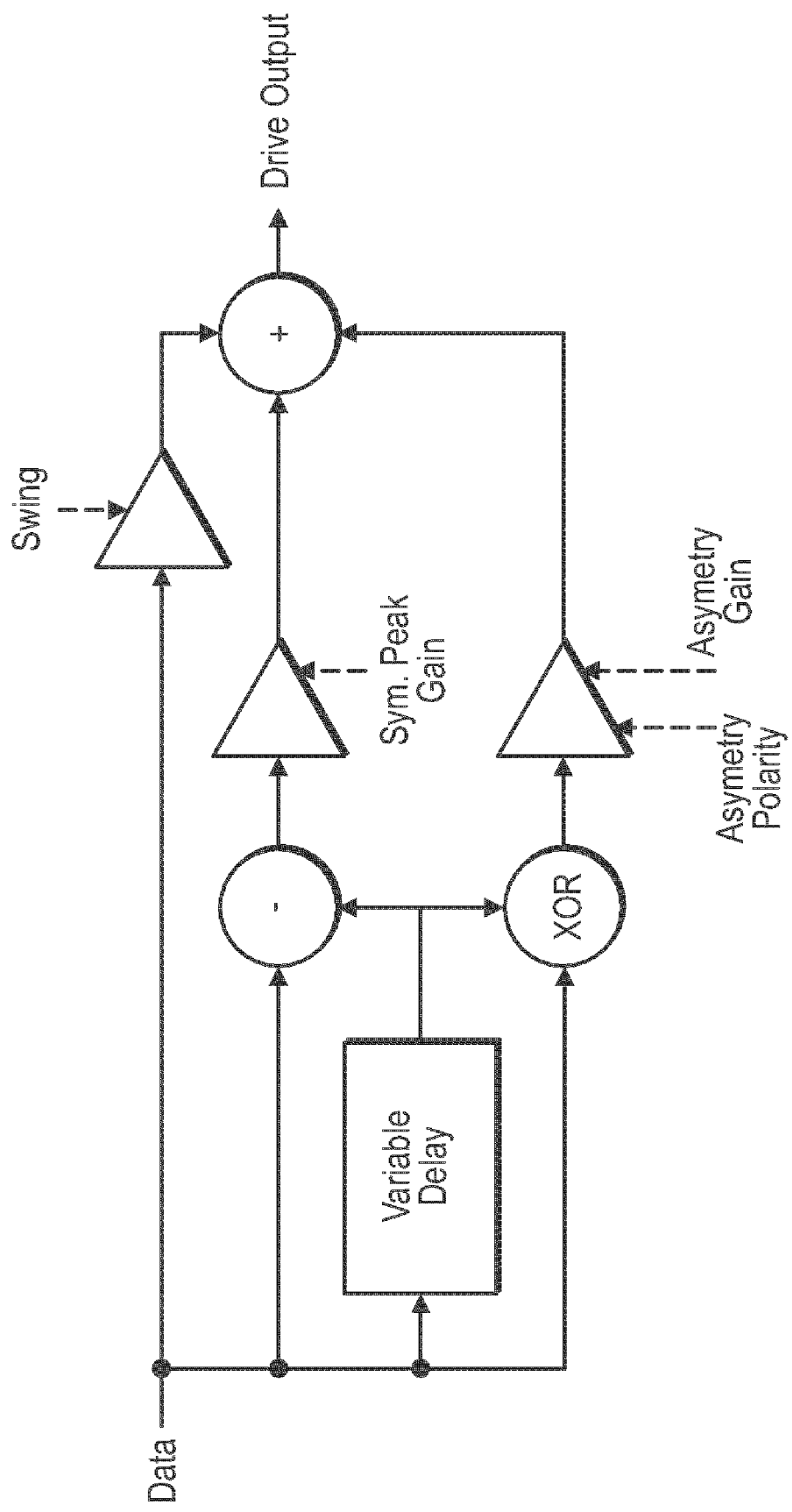
FIG. 7 illustrates a signal boost circuit that may be implemented by an embodiment of a dual laser driver architecture in accordance with the embodiments disclosed herein.

As illustrated in FIG. 3, in some embodiments, laser driver architecture 300 may include a boost stage 350. In operation, boost stage 300 is configured to provide a signal boost to the signals output by first and second driver stages 338 and 349. Advantageously, boost stage 350 may be shared by both high power path 330 and low power path 340, thus saving on chip space and cost. An example of a boost stage is shown in FIG. 7.

Coupled to boost stage 350 are a buffer stage 355 and a buffer stage 356. Buffer stage 355 is configured to buffer the signal from boost stage 350 prior to the boost signal being added to the signal output from first driver stage 338. In like manner, buffer stage 356 is configured to buffer the signal from boost stage 350 prior to the boost signal being added to the signal output from second driver stage 348.

Accordingly, the principles of the present invention disclose a dual laser driver architecture that may be implemented on a single IC and that may also be implemented as part of an optical transceiver. Implementing both laser drivers of the dual laser driver architecture on a single IC allows for reduced space and cost of manufacturing. In addition, putting both drivers on the same chip allows for the sharing of bias mechanisms for the transistors and other components that make up both of the drivers. Further, as previously described, because both drivers are in close proximity as discussed in paragraph 41, EMI emissions from the IC chip may be reduced and power may be saved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dual laser driver architecture configured to be implemented on a single IC chip comprising at least:
    a first laser driver stage, the first laser driver stage being configured to drive a first laser with a first current; and
    a second laser driver stage, the second laser stage being configured to drive a second laser with a second current that is less than the first current, wherein the first laser driver stage is an active match laser driver and the second laser driver stage is a CML laser driver.

2. The dual laser driver architecture in accordance with claim 1, wherein the first laser is one of a DFB laser, FP laser, or VCSEL laser.

3. The dual laser driver architecture in accordance with claim 1, wherein the second laser is a VCSEL.

4. The dual laser driver architecture in accordance with claim 1, wherein the first current is approximately 80 mA and the second current is approximately 14 mA.

5. The dual laser driver architecture in accordance with claim 1, wherein the first and second laser driver stages include or are coupled to a cross-point adjustment circuit and/or an independent rise/fall time control circuit.

6. The dual laser driver architecture in accordance with claim 1, wherein the first and second laser driver stages are connected to a signal boost circuit configured to provide a boost to the signal output from the first and second laser driver stages.

7. A dual laser driver architecture configured to be implemented on a single IC chip comprising at least:
    a first laser driver stage, the first laser driver stage being configured to drive a first laser with a first current; and
    a second laser driver stage, the second laser stage being configured to drive a second laser with a second current that is less than the first current, wherein the first and second laser driver stages are connected to a post-amplifier through a multiplexer stage.

8. The dual laser driver architecture in accordance with claim 1, wherein implementing the first and second laser driver stages on a single IC chip at least partially reduces EMI emissions.

9. The dual laser driver architecture in accordance with claim 1, wherein a control module selects which one of the first and second laser driver stages are to be used.

10. An optical transceiver comprising:
    a post-amplifier;
    an optical receiver coupled to the post-amplifier;
    a laser driver comprising at least:
        a first laser driver stage, the first laser driver stage being configured to drive a first laser with a first current; and
        a second laser driver stage, the second laser stage being configured to drive a second laser with a second current that is less than the first current;

a first electro-optical transducer coupled to the first driver stage;

a second electro-optical transducer coupled to the second driver stage; and a control module coupled to the post-amplifier and the laser driver.

11. The optical transceiver in accordance with claim 10, wherein the first electro-optical transducer is one of a DFB laser, FP laser, or VCSEL laser.

12. The optical transceiver in accordance with claim 10, wherein the second electro-optical transducer is a VCSEL.

13. The optical transceiver in accordance with claim 10, wherein the first current is approximately 80 mA and the second current is approximately 14 mA.

14. The optical transceiver in accordance with claim 11, wherein the first laser driver stage is an active match laser driver and the second laser driver stage is a CML laser driver.

15. The optical transceiver in accordance with claim 10, wherein the first and second laser driver stages include or are coupled to a cross-point adjustment circuit, and/or an independent rise/fall time control circuit, and/or a signal boost circuit configured to provide a boost to the signal output from the first and second laser driver stages.

16. The optical transceiver in accordance with claim 10, wherein the post-amplifier and the laser driver are implanted on a single IC chip.

17. The optical transceiver in accordance with claim 16, wherein the first and second laser driver stages are connected to the post-amplifier through a multiplexer stage.

18. The optical transceiver in accordance with claim 10, wherein implementing the first and second laser driver stages on a single IC chip at least partially reduces EMI emissions.

19. The optical transceiver in accordance with claim 10, wherein the control module selects which one of the first and second laser driver stages are to be used during operation of the optical transceiver.

* * * * *